(12) United States Patent
Seki et al.

(10) Patent No.: US 10,771,647 B2
(45) Date of Patent: Sep. 8, 2020

(54) IMAGE READING APPARATUS AND IMAGE FORMING APPARATUS

(71) Applicant: CANON KABUSHIKI KAISHA, Tokyo (JP)

(72) Inventors: Satoshi Seki, Tokyo (JP); Asahiro Nakayoshi, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/254,481

(22) Filed: Jan. 22, 2019

(65) Prior Publication Data

US 2019/0238703 A1 Aug. 1, 2019

(30) Foreign Application Priority Data

Feb. 1, 2018 (JP) .................................. 2018-016105

(51) Int. Cl.
*H04N 1/00* (2006.01)
*H04N 1/387* (2006.01)

(52) U.S. Cl.
CPC ..... *H04N 1/00801* (2013.01); *H04N 1/00588* (2013.01); *H04N 1/00726* (2013.01); *H04N 1/3878* (2013.01); *H04N 2201/0081* (2013.01)

(58) Field of Classification Search
CPC ................................................ H04N 1/00801
USPC ....................................................... 358/474
See application file for complete search history.

(56) References Cited

U.S. PATENT DOCUMENTS

| | | | |
|---|---|---|---|
| 6,176,480 B1 * | 1/2001 | Yonenuma | B65H 29/00 270/58.08 |
| 8,310,733 B2 | 11/2012 | Sekiguchi et al. | 358/474 |
| 8,432,586 B2 | 4/2013 | Hamano et al. | 358/505 |
| 10,038,801 B2 | 7/2018 | Nakayoshi et al. | H04N 1/00801 |
| 10,110,776 B2 | 10/2018 | Sunada et al. | H04N 1/00588 |
| 2005/0238205 A1* | 10/2005 | Kimura | G06K 9/03 382/112 |
| 2007/0140710 A1* | 6/2007 | Okano | G03G 15/55 399/13 |

(Continued)

FOREIGN PATENT DOCUMENTS

JP 2000-244728 9/2000

OTHER PUBLICATIONS

U.S. Appl. No. 16/217,823, filed Dec. 12. 2018.

*Primary Examiner* — Jacky X Zheng
(74) *Attorney, Agent, or Firm* — Venable LLP

(57) ABSTRACT

An image reading apparatus capable of determining whether or not to perform an inclination correction for an original to be read is provided. The image reading apparatus comprises a pair of guide plates to sandwich an end of the original in a width direction, an original guide width detection sensor for measuring a width between the guide plates with the original sandwiched, various rollers for conveying the original, and a surface reading unit for reading an image of the original. The image reading apparatus further comprises an image processing part which detects the width of the original being conveyed as an original width to detect an amount of inclination of the original being conveyed. Further, the image processing part corrects the image of the original read in accordance with the amount of inclination detected. The image reading apparatus compares the guide width with the original width and controls whether or not to perform the inclination correction in accordance with a result of the comparison.

19 Claims, 11 Drawing Sheets

(56) References Cited

U.S. PATENT DOCUMENTS

| | | | |
|---|---|---|---|
| 2015/0288838 A1* | 10/2015 | Tanaka | H04N 1/00742 358/474 |
| 2016/0261758 A1* | 9/2016 | Kimura | H04N 1/0032 |
| 2017/0214816 A1 | 7/2017 | Yamakawa et al. | H04N 1/00891 |
| 2018/0332183 A1 | 11/2018 | Seki et al. | H04N 1/00997 |

* cited by examiner

| NUMBER | (1) | (2) | (3) | (4) |
|---|---|---|---|---|
| DETECTED INCLINATION ANGLE | LESS THAN 5° | MORE THAN 5° | MORE THAN 5° | LESS THAN 5° |
| SIZE RELATION OF WIDTH | ORIGINAL GUIDE WIDTH+α > DETECTED MAIN SCANNING WIDTH | ORIGINAL GUIDE WIDTH+α ≦ DETECTED MAIN SCANNING WIDTH | ORIGINAL GUIDE WIDTH+α > DETECTED MAIN SCANNING WIDTH | ORIGINAL GUIDE WIDTH+α ≦ DETECTED MAIN SCANNING WIDTH |

FIG. 7

IMAGE READING APPARATUS AND IMAGE FORMING APPARATUS

BACKGROUND OF THE INVENTION

Field of the Invention

The present disclosure relates to a technology of an image reading apparatus.

Description of the Related Art

In an image reading apparatus comprising an auto document feeder (ADF) which is mounted on a copying machine and the like, due to an abrasion of a conveying roller and the like, an image of an original may be read in a state in which the original is relatively inclined with respect to a reading sensor.

When the image reading apparatus reads the image of the original which is in the inclined state, image data to be obtained is also in the inclined state, which is unfavorable to a user. Due to this, processing to correct the inclination of the image data read may be performed. Here, generally, there is a maximum correction angle capable of correcting the inclination in the inclination correction by the processing of the image data. The maximum correction angle depends on a capacity of an image memory used for the correction.

For example, Japanese Patent Application Laid-Open No. 2000-244728 proposes a processing method performed in a case where an inclination of an original exceeds the maximum correction angle. In the processing method, a user performs setting of equipment and, in accordance with the setting, it is possible to select 1) not to perform the inclination correction, or 2) to perform processing to correct the inclination to the maximum correction angle.

However, when employing this method, there is a case where it is difficult to correctly read the original even if the inclination correction is performed, therefore, the user has to perform the setting of the equipment for the inclination correction before image reading is performed. For example, if a front end of the original is skewed or the original has a tab, a possibility of normally performing the inclination correction is reduced.

It is necessary for the user to determine not to perform the inclination correction in a case where a possibility of normally performing the inclination correction is low even if the inclination correction is performed. It is also necessary for the user to determine to perform the inclination correction in a case where the original has a rectangular original and a possibility of normally performing the inclination correction is high. As mentioned, there is a problem in that the user needs to presume whether there is a problem or not in performing the inclination correction from the original and perform the setting every time, which deteriorates usability as the apparatus.

SUMMARY OF THE INVENTION

An image reading apparatus according to the present disclosure includes: a tray on which an original is to be placed; a conveyor configured to convey the original placed on the tray; a detector configured to detect a first width corresponding to a size of the original in a width direction perpendicular to a conveying direction of the original; an image reader configured to read an image of the original being conveyed by the conveyor to output image data; a processor configured to: detect, based on the image data, a second width corresponding to a size of the original in the width direction; determine an inclination correction condition for the image data; perform, based on the inclination correction condition, a skew correction for the image data, and a controller configured to determine, based on the first width and the second width, whether or not to perform the skew correction for the image data.

Further features of the present invention will become apparent from the following description of exemplary embodiments (with reference to the attached drawings).

BRIEF DESCRIPTION OF THE DRAWINGS

FIG. 7 is a table showing a relation of an inclination angle of the original, an original guide width and the detected main scanning width.

DESCRIPTION OF THE EMBODIMENTS

In the following, giving examples where the present disclosure is applied to the image reading apparatus, embodiments will be described with reference to the accompanying drawings.

First Embodiment

Configuration Example of Image Reading Apparatus and Image Forming Apparatus

Figure 1:
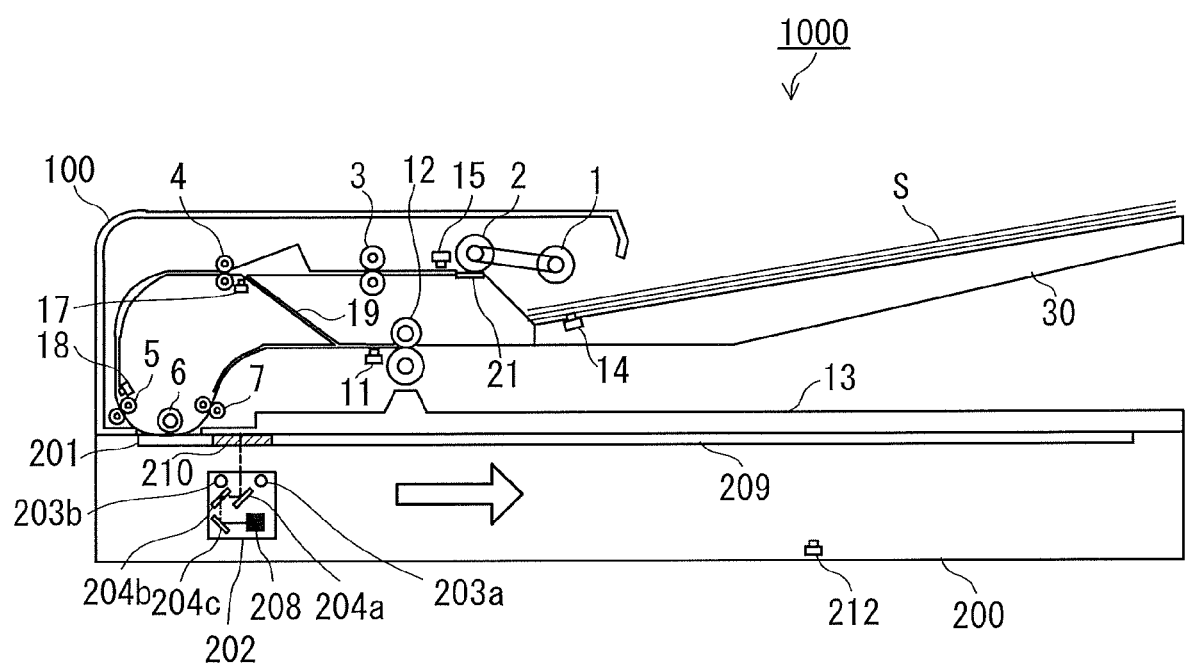
FIG. 1 is a cross sectional view showing an example of an image reading apparatus according to a first embodiment.

FIG. 1 is a cross sectional view showing an example of an image reading apparatus including the ADF. An image reading apparatus 1000 of the present embodiment comprises an image reader 200 which reads the image of the original and an auto document feeder (hereinafter, referred to as ADF) 100. Further, a controller 300 (not shown) is connected to the image reading apparatus 1000. In the following, operations of the ADF 100 will be described with reference to FIG. 1.

Configuration Example of ADF

In the following, one-side original reading operation (hereinafter, referred to as one-side flow reading) using the ADF 100 will be described. The ADF 100 comprises an original tray 30 on which an original bundle S consisting of one or more original sheets are stacked. The ADF 100 also comprises a separation pad 21 and a separation roller 2 for restricting advancement of the original bundle S from the original tray 30 to a downstream side before conveyance of the original is started and a sheet feeding roller 1. An original detection sensor 14 is arranged on the original tray 30, which enables to determine presence/absence of the original on the original tray 30 in accordance with a result of detection of the sensor. For example, it is possible to stack a maximum of 100 sheets of plain paper on the original tray 30. The sheet feeding roller 1 falls on a surface of the original of the original bundle S stacked on the original tray 30 and rotates. Thus, the original of a top most surface of the original bundle is fed toward a predetermined conveying direction. The original fed by the sheet feeding roller 1 is separated one by one by an action of the separation roller 2 and the separation pad 21. The separation is achieved by a well-known separation technology.

The original separated by the separation roller 2 and the separation pad 21 is conveyed toward a registration roller 4 by a drawing roller 3. A sheet feeding path which conveys the original having passed through the registration roller 4 in a surface flow reading glass 201 direction is formed on a downstream side of the registration roller 4. The original conveyed toward the registration roller 4 is butted on the registration roller 4. Due to this, loop-shaped bending is caused on the original and a loop is formed, which eliminates the inclination of the original at the time of conveying the original. However, if the original is not a rectangular-shaped original and the front end side of the original is skewed, the original further inclines. Also, even when the inclination of the original is eliminated by butting the original on the registration roller 4, the original may incline again before reaching an original reading position.

For example, in one case, a tag or a picture attached to the original is caught in an original conveying path, in another case, the original is not conveyed straight due to distortion in the registration roller 4 or a reading upstream roller 5, and there may be further cases in which the original inclines again before reaching the original read position. The original sent to the sheet feeding path is conveyed to the image reading position through the reading upstream roller 5. A surface of the original which passes through between the surface flow reading glass 201 and a reading roller 6 is irradiated by an LED 203a and an LED 203b. While the reflection light is reflected through a plurality of mirrors 204a, 204b and 204c, a front side image of the original is read by a reading sensor 208 by one line (hereinafter, referred to as surface reading).

The original conveyed by a reading downstream roller 7 is conveyed to an original delivery tray 13 by a sheet delivery roller 12 while passing through a sheet delivery sensor 11 when only reading a front side image of the original. When there are a plurality of originals on the original tray 30, the processing as previously mentioned is repeated until a final original is read and the final original is delivered to the original delivery tray 13.

When reading a back side image as well, the original is stopped after the front side image is read and a rear end of the original passes through the sheet delivery sensor 11 and before the original passes through the sheet delivery roller 12. Then, by reversely rotating the sheet delivery roller 12, the original is conveyed toward the registration roller 4 and by conveying the original in the same manner as previously mentioned, the back side of the original can be read. After reading of the back side image is completed, the original is stopped after the rear end of the original passes through the sheet delivery sensor 11 and before the original passes through the sheet delivery roller 12. Then, the original is conveyed again toward the registration roller 4 and the original is conveyed to the original delivery tray 13 without reading the image. When there are a plurality of originals on the original tray 30, the processing as previously mentioned is repeated until the final original is read and the final original is delivered to the original delivery tray 13.

Configuration example of image reading part

To read the original placed on a platen glass 209, the image reader 200 moves a surface reading unit 202 which is configured to be movable by an optical system motor 226 (not shown in FIG. 1.) in a sub-scanning direction indicated by an arrow in FIG. 1 at a constant speed. Thus, the image reader 200 reads information on the image recorded on the original by one line by the reading sensor 208 (hereinafter, referred to as fixed reading).

Further, the image reader 200 moves the surface reading unit 202 to a center position of the surface flow reading glass 201 of the ADF 100 (hereinafter, referred to as a surface flow reading original reading position), feeds and conveys the original stacked on the original tray 30 to read the surface of the original by the reading sensor 208 (one-side flow reading). When reading both sides of the original stacked on the original tray 30, the front side is read in the same manner as the one-side flow reading and the back side is read through a back surface reading unit 102 equipped in the ADF 100 as previously mentioned (double-sided flow reading).

Figure 2:
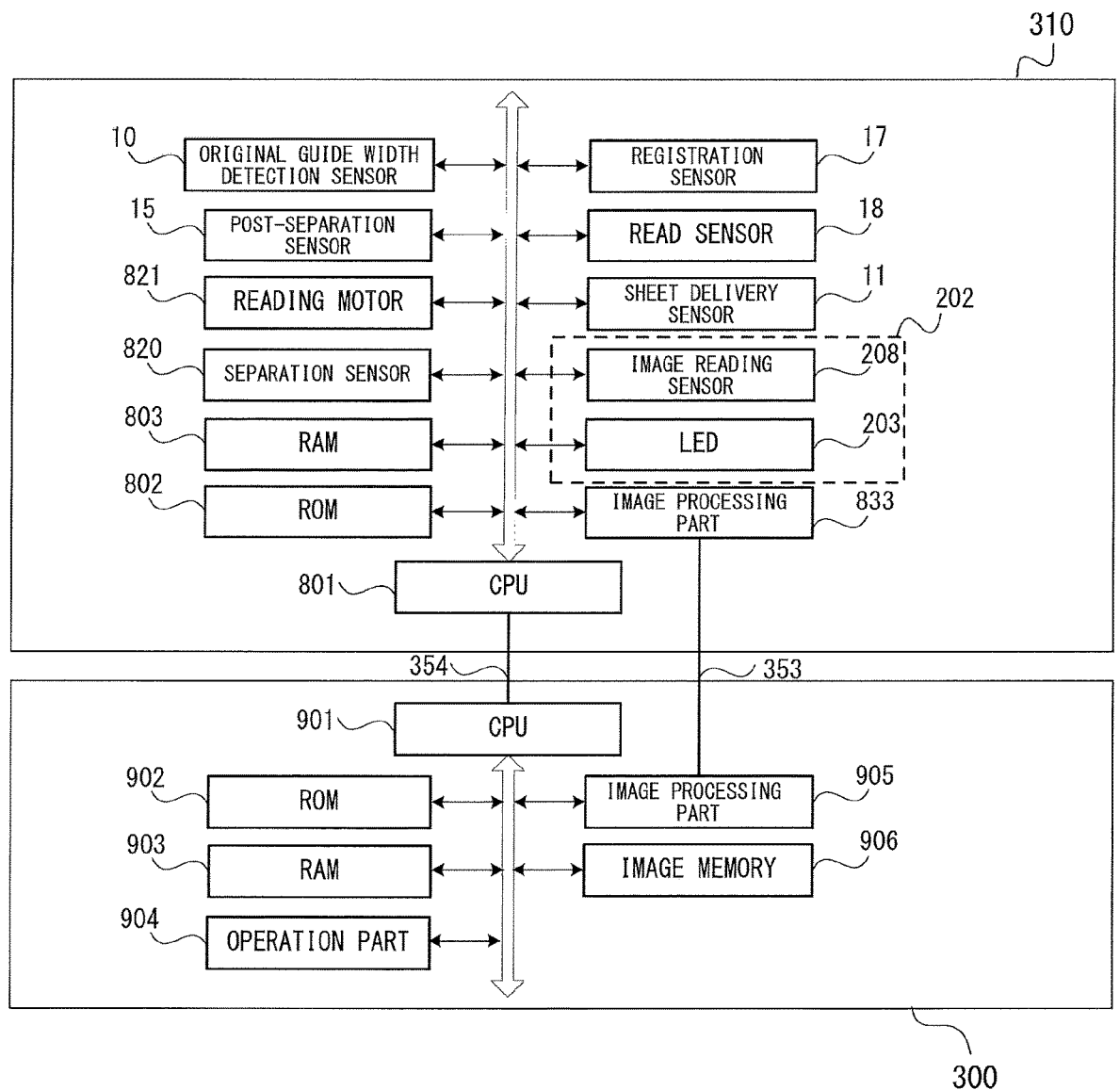
FIG. 2 is a block diagram showing a configuration example of a control part included in the image reading apparatus.

FIG. 2 is a block diagram showing a configuration example of a control part included in the image reading apparatus 1000. A reader ADF controller 310 comprises a CPU 801 for the reader ADF controller 310 which is a central processing unit, a ROM 802 which is a read only memory, and a RAM 803 which is a random access memory. It is noted that a control program for the CPU 801 is stored in the ROM 802. Further, input data or work data used by the CPU 801 is stored in the RAM 803.

A separation motor 820 is connected to the CPU 801. The separation motor 820 rotationally drives the sheet feeding roller 1, the separation roller 2, the drawing roller 3, and the registration roller 4. A reading motor 821 is also connected to the CPU 801. The reading motor 821 drives the reading upstream roller 5, the reading roller 6, the reading downstream roller 7, and the sheet delivery roller 12. The CPU 801 realizes an original conveying function by controlling these function parts.

By regularly rotating the separation motor 820, the CPU 801 can rotate the sheet feeding roller 1, the separation roller 2, the drawing roller 3, and the registration roller 4 in a direction of feeding the original downstream. A post-separation sensor 15, a registration sensor 17, a read sensor 18, and the sheet delivery sensor 11 which detect an end of the original on a sheet conveying path are connected to the CPU 801. It is noted that the separation motor 820 and the reading motor 821 are pulse motors and the CPU 801 manages the number of driving pulses of each motor. The CPU 801 monitors and controls the position of the original during the conveyance by relating the number of driving pulses of each motor to a detection state of the original by various sensors arranged on the conveying path as previously mentioned.

Figure 3:
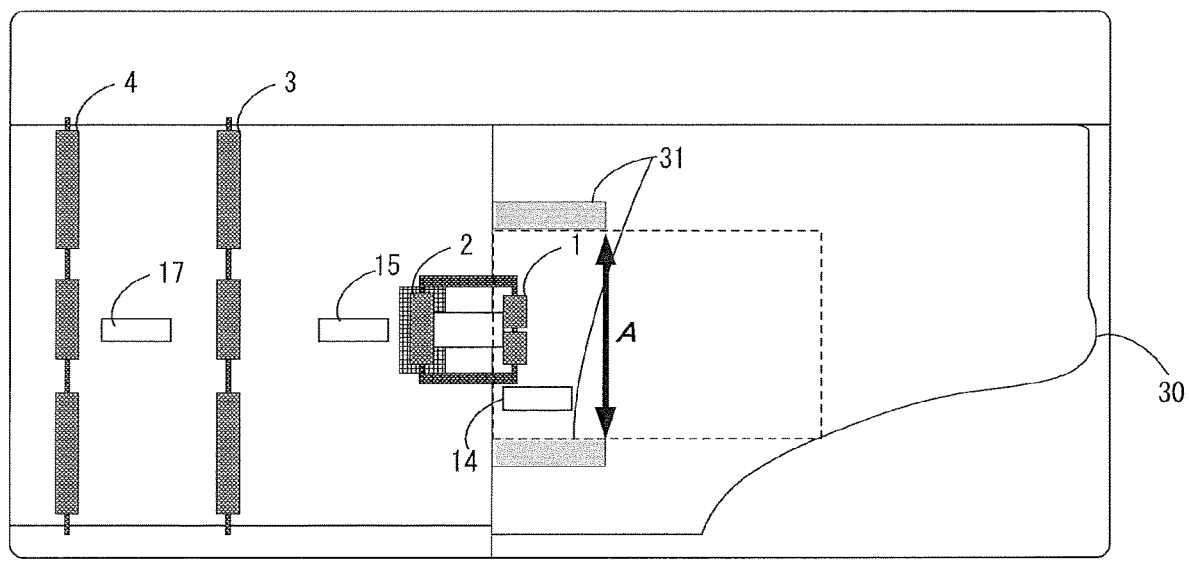
FIG. 3 is a top view of the image reading apparatus.

FIG. 3 is a top view of the image reading apparatus 1000. As shown in FIG. 3, a pair of guide plates (original guide plates 31) is arranged on the original tray 30. The original guide plates 31 are arranged in parallel with the conveying direction of the original placed on the original tray 30 and sandwich the ends of the original in the width direction from both sides. The CPU 801 can detect a width between the original guide plates 31 on the original tray 30 (guide width) by referring to a value of an original guide width detection sensor 10. The original guide width detection sensor 10 functions as a guide width measuring means. For example, when the user places the original on the original tray 30 and aligns the original plates 31 with the width of the original, as shown in FIG. 3, the original width equals to the width between the original guide plates 31, which is shown in "A" in FIG. 3, so that the CPU 801 can detect the width of the original in accordance with the width between the original guide plates 31.

To realize an image reading function, an LED 203 which irradiates light to the surface of the original and the image reading sensor 208 are also connected to the CPU 801. Image data read by the image reading sensor 208 is directly sent to the controller through an image processing part 833. The CPU 801 transmits the read image data to the controller 300 through an image line 353. Further, by controlling timing by the CPU 801, a vertical synchronizing signal as a reference of the front end of the original image data and a horizontal synchronizing signal as a reference of the front end of the pixel of one line are notified to the controller 300 through a controller IF part 354.

The controller 300 comprises a CPU 901, a ROM 902, and a RAM 903. The controller 300 transfers data concerning image reading control with the CPU 801 through the controller IF part 354. It is noted that the image data is transferred through the image line 353 between the image processing part 833 and an image processing part 905. The data received from the image reader 200 is stored in an image memory 906. The controller 300 comprises an operation part 904. The CPU 901 of the controller 300 performs interface control to the user through the operation part 904.

Method for Detecting and Correcting Inclination

In the following, a method for detecting and correcting the inclination of the original of the image reading apparatus 1000 will be described. The image processing part 833 measures an amount of inclination of the original by detecting a shadow image of the end of the original from the image read by the image reading sensor 208 in a predetermined section. The CPU 801 receives the amount of inclination from the image processing part 833.

Further, using affine transformation, the image processing part 833 rotates the image read by the amount of inclination which is set by the CPU 801. It is noted that in the present embodiment, due to restriction of memory capacity, the inclination correction of less than 5° is performed. As described, the CPU 801 can perform the inclination correction of the image which is output from the image processing part 833.

Here, the affine transformation will be described. The affine transformation calculates positions of the pixel (main scanning (X), sub-scanning (Y)) for correcting an angle θ in accordance with the amount of inclination. x0 and y0 are movement amounts for translating inclination-corrected data and it becomes possible to match an output position of the front end and the end of the image. A general formula of the affine transformation is shown below as a formula 1.

$$X=x\cos\theta-y\sin\theta+x0,\ Y=x\sin\theta+y\cos\theta+y0\ \ldots \quad \text{(formula 1)}$$

where X is the pixel position in the main scanning direction after the correction; Y is the pixel position in the sub-scanning direction after the correction; x is the pixel position in the main scanning direction before the correction; y is the pixel position in the sub-scanning direction before the correction; x0 is the amount of translation in the main scanning direction (main scanning inclination correction reference position); y0 is the amount of translation in the sub-scanning direction (sub-scanning inclination correction reference position, and θ is an angle based on the inclination calculated from the front end of the original.

The affine transformation as mentioned above is the general formula. When realized in an integrated circuit, an operation expression (formula 2) shown below is used as $\cos\theta \approx 1$.

$$X=x-y\tan\theta+x0,\ Y=x\tan\theta+y+y0\ \ldots \quad \text{(formula 2)}$$

where X is the pixel position in the main scanning direction after the correction; Y is the pixel position in the sub-scanning direction after the correction; x is the pixel position in the main scanning direction before the correction; y is the pixel position in the sub-scanning direction before the correction; x0 is the amount of translation in the main scanning direction (main scanning inclination correction reference position); y0 is the amount of translation in the sub-scanning direction (sub-scanning inclination correction reference position), and tanθ is the amount of inclination of the original (inclination correction condition).

In the present embodiment, the inclination detection and correction are performed by detecting the inclination by the shadow of the front end of the original and rotating the image by the affine transformation. The present disclosure is not limited to this method but other methods may be used. In the following, a detection method of the main scanning width of the original including the inclination of the original of the image reading apparatus 1000 will be described with reference to FIG. 3, FIG. 4A and FIG. 4B.

Figure 4A:
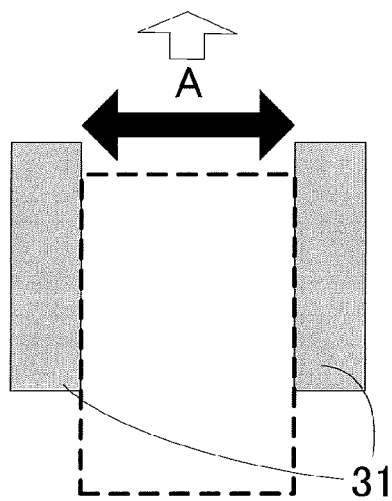
FIG. 4A and FIG. 4B are diagrams for describing a detection method of the inclination of the original.
Figure 4B:
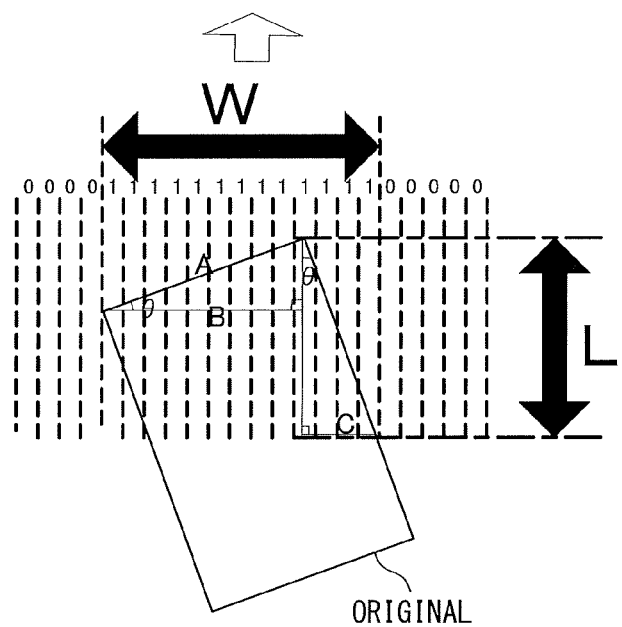

Detection Method of the Main Scanning Width Including the Inclination of the Original FIG. 4A and FIG. 4B are diagrams for describing a detection method of the inclination of the original performed by the image processing part 833. FIG. 4A shows a state in which the original having an original width A is at a sheet feeding position. FIG. 4B schematically shows a detected main scanning width W which is detected when the original is conveyed from the sheet feeding position and it is inclined by an angle θ during the conveyance. As shown in FIG. 3 and FIG. 4A, it is assumed that the user sets the original having the original width A on the original tray 30 and closely aligns the original guide plates 31 with the original. In this case, the width between the original guide plates 31 (A shown in FIG. 3 and A shown in FIG. 4A) also represents the original width. In the following, the width A between the original guide plates 31 is referred to as an original guide width. It is noted that only one movable guide plate for regulating the position of the original on the tray may be used and the position of the original may be regulated by a fixed guide part and the movable guide plate. In this case, by detecting a position of the movable guide, information corresponding to the original guide width of the above-mentioned embodiment can be obtained. Thus, in the present embodiment, a size which corresponds to the main scanning width of the original is detected based on the position of the original guide.

The image processing part 833 can detect the original width (length of an arrow W shown in FIG. 4B) when the image processing part 833 receives an image corresponding to a length previously set by the CPU 801 (length of an arrow L shown in FIG. 4B). To calculate the original width W, for example, "1" is set for each main scanning pixel position where an edge by the shadow of the end of the original exists for each line. Then, by calculating the width where "1" is finally set when receiving the image corresponding to the length (the number of lines) previously set, the image processing part 833 can realize the width detection. It is noted that, in the present embodiment, the width detection is performed by reading the image of 100 mm from a position where the edge is first found.

In FIG. 4A and FIG. 4B, the length L between dashed lines shown in the figure corresponds to the original width W. Further, in FIG. 4B, an area between each of the dotted lines indicates the main scanning position in the image reading sensor 208. FIG. 4B also indicates a case where "1" is set when the edge of the original is found and "0" is set when no edge of the original is found for each main scanning position. The image processing part 833 detects the width having the edge by counting the number of pixels where the edge is found and "1" is set. When using this detection method, if the original is conveyed inclined in FIG. 4B, a width W is detected. The width W is the main scanning width of the original in which the inclination θ is reflected. In the following, the width W detected by this detection method is referred to as a detected main scanning width. As mentioned, in the present embodiment, a size corresponding to the main scanning width of the original is detected from the image data.

Relation between the detected main scanning width and the original guide width will be described. The inclination of the original is not incorporated in the original guide width A, which is different from the detected main scanning width W. Here, as shown in FIG. 4B, two right-angled triangles are formed and the bases of the triangles are defined as B and C. Among the original guide width A indicating the original width when there is no inclination, the detected main scanning width W and the inclination of the original θ detected by the above-mentioned manner, and the detected length of the original width L, relation of a formula 3 shown below is established.

$$W=B+C=A\sin(180-90-\theta)°+L/\tan(180-90-\theta) \ldots \quad \text{(formula 3)}°$$

Figure 5:
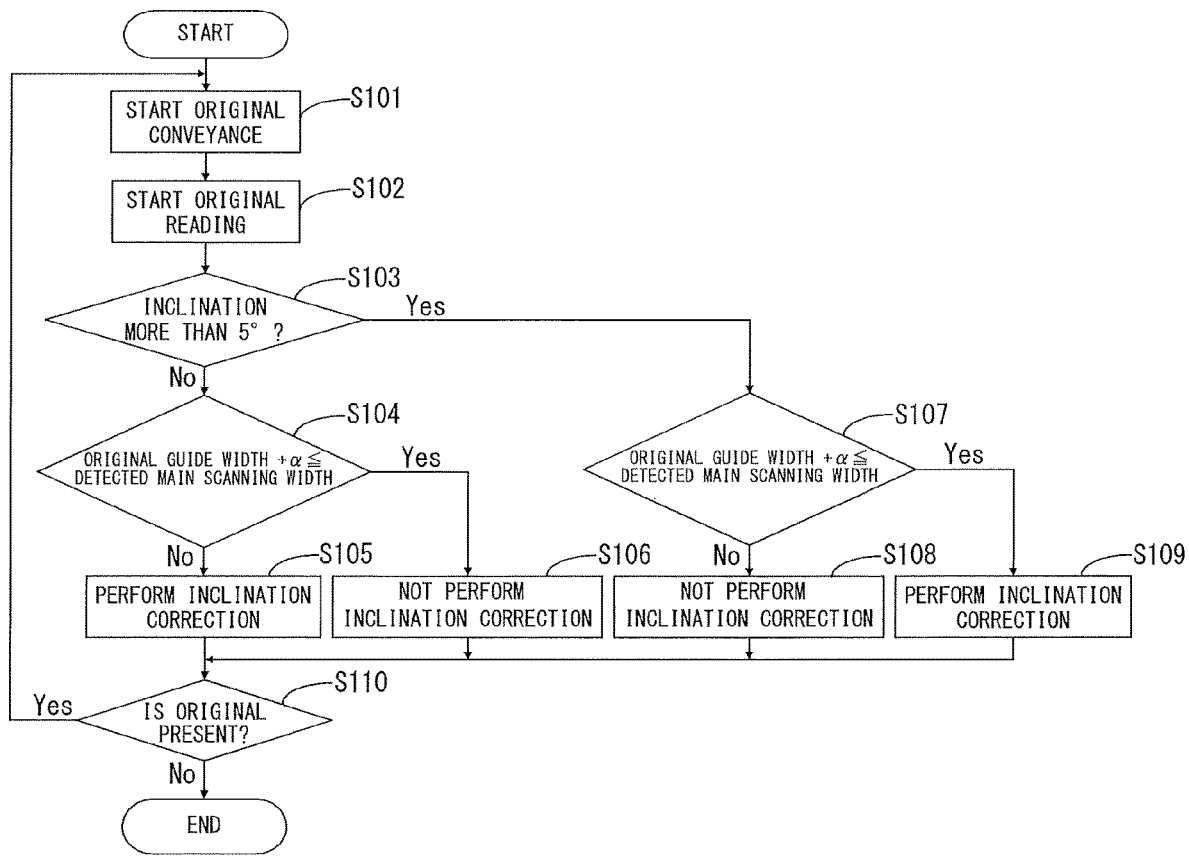
FIG. 5 is a flow chart showing an example of processing procedure of image reading processing by the image reading apparatus.
Figure 6:
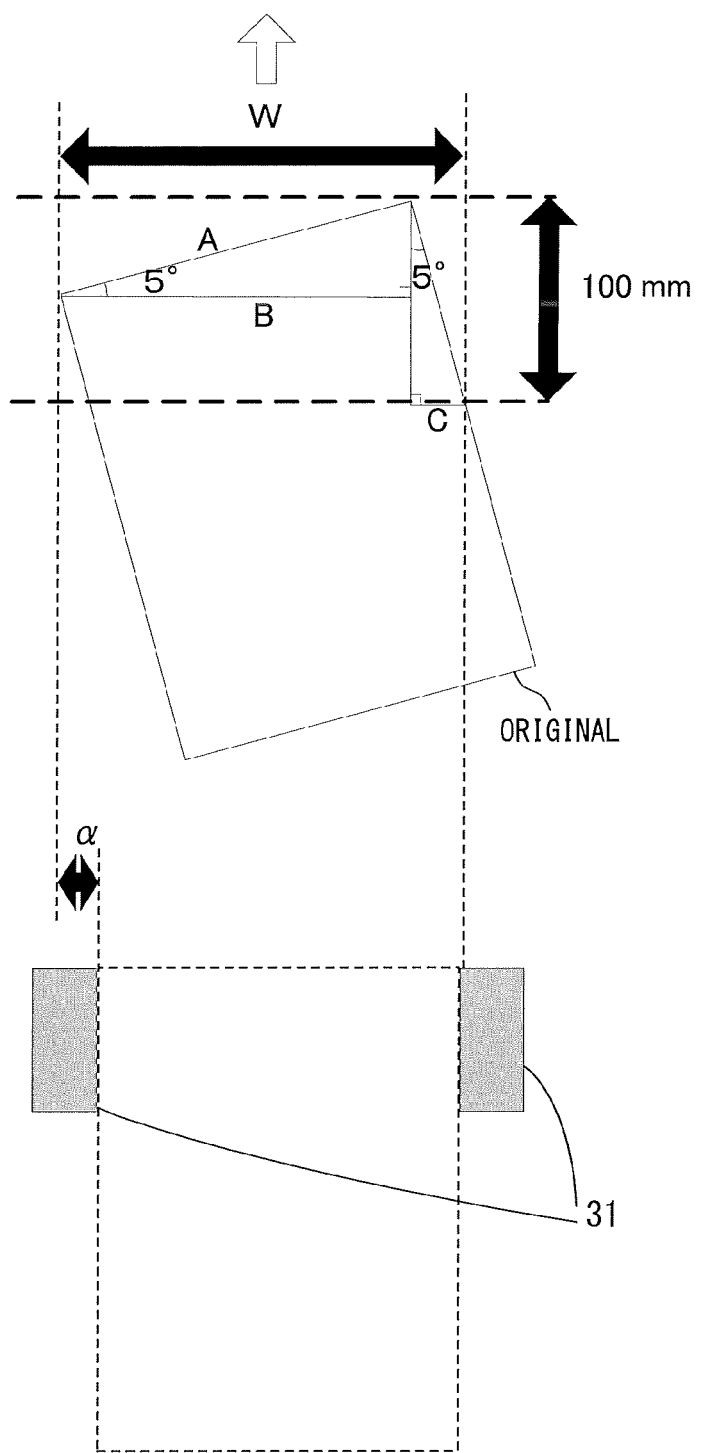
FIG. 6 is a diagram showing the original which is conveyed inclined with respect to original guide plates and a detected main scanning width of the original.

It is noted that, in the present embodiment, width detection by detecting the shadow of the end of the original as above is used, however, the present disclosure is not limited to the width detection by detecting the shadow. For example, the width of the original may be derived using a flag sensor. In particular, a plurality of flag sensors arranged in the main scanning direction may be provided in the original conveying path. If the original turns on the flag sensor arranged in the main scanning direction at a predetermined timing, by counting the number of the flag sensors which are turned on, the width of the original may be derived. Even in this method, if the original is conveyed inclined, the main scanning width of the original in which the inclination is incorporated is detected. In the following, the inclination correction when performing an image reading job of the image reading apparatus 1000 will be described with reference to FIG. 5, FIG. 6, and FIG. 7. Inclination correction method at the time of image reading job FIG. 5 is a flowchart showing an example of the processing procedure of image reading processing performed by the image reading apparatus 1000. It is noted that the CPU 801 mainly performs each processing shown in FIG. 5. FIG. 6 is a diagram showing the original which is conveyed inclined with respect to the original guide plates 31 and the detected main scanning width of the original. FIG. 7 is a table showing the relation of the inclination angle of the original, the original guide width, and the detected main scanning width. The description is given assuming that the user of the image reading apparatus 1000 performs the image reading by placing the original on the original tray 30 and operating the operation part 904. In this case, the CPU 901 outputs an image reading execution instruction (job execution instruction) to the CPU 801. When receiving the job execution instruction, the CPU 801 starts the flow reading of the original mentioned in the configuration example of the auto document feeder (ADF) 100.

The CPU 801 starts to convey the original placed on the original tray 30 (Step S101). The CPU 801 starts to read the original conveyed near the reading position (read the image of the original) (Step S102). The CPU 801 detects the inclination of the image of the original read in the processing of the step S102 using the inclination detection function of the image processing part 833 as previously mentioned and determines, based on a result of the detection, whether the inclination is a correctable angle or not (Step S103).

If the inclination of the image of the original is the correctable angle of less than 5° (Step S103: No), the CPU 801 compares the original guide width to be detected by the original guide width detection sensor 10 with the detected main scanning width detected by the detection function of the main scanning width of the original of the image processing part 833 (Step S104). In this comparison, the increase in width from the original guide width in the detected main scanning width caused by the inclination of the original of 5° which is the correctable maximum angle is defined as an increased width α.

Here, it is assumed that the detected main scanning width is a width detected to the position of 100 mm from the front edge position using the main scanning width detection method. Also, the original guide width is a width obtained when the user closely aligns the original guide plates 31 with the original when the user places the original on the original tray 30 and the width between the guide plates is equal to the original width. In this case, if the inclination of the original is 5°, the original guide width +α is equal to the detected main scanning width (original guide width+α=detected main scanning width).

Further, as shown in FIG. 6, the detected main scanning width to the position of 100 mm from the front end is represented by a black arrow width W, which is equal to B+C (black arrow width W=B+C). Thus, using a fact that the original guide width is equal to original guide width A (original guide width=original width A), the increased width α caused if the inclination of the original is 5° can be expressed as a formula 4 shown below.

$$\alpha=B+C-A=A\sin(180-90-5)°+ 100/\tan(180-90-5)°-A \ldots \quad \text{(formula 4)}$$

The calculated α is used to compare the lengths. If the user closely aligns the original guide plates 31 with the original, if the inclination of the original is less than 5° at the time of reading the original, a rectangular fixed form original has the relation of ""original guide width+α">detected main scanning width". Then, control is performed by dividing conditions as follows using the increased width α.

If "original guide width+α>detected main scanning width" (Step S104: No), the CPU 801 determines that the original is the rectangular fixed form original such as (1) shown in FIG. 7 and performs the inclination correction (Step S105).

If "original guide width+α≤detected main scanning width" (Step S104: Yes), the CPU 801 determines that the original is the original of which front end side is inclined and is not the fixed form original such as (4) shown in FIG. 7. In this case, the CPU 801 does not perform inclination correction (Step S106). Further, it is assumed, in the processing of the step S103, that the inclination of the image of the original is equal to or more than 5° which is the inclination that cannot be corrected by the inclination correction function (Step S103: Yes). In this case, the CPU 801 compares the width between the original guide plates 31 to be detected by the original guide width detection sensor 10 with the detected main scanning width detected by the detection method of the main scanning width of the original as previously mentioned (Step S107). It is noted that, in this comparison, if the same α as before is used, if the inclination of the original at the time of reading the original is equal to or more than 5°, the rectangular fixed form original has the relation of "original guide width+α≤detected main scanning width". Then, the widths are compared as follows.

If "original guide width+α>detected main scanning width" (Step S107: No), the CPU 801 determines that the original is the original of which front end side is inclined and is not the fixed form original such as (3) shown in FIG. 7. In this case, the CPU 801 does not perform inclination correction (Step S108).

If "original guide width+α≤detected main scanning width" (Step S107: Yes), the CPU 801 determines that the original is the rectangular fixed form original such as (2) shown in FIG. 7 and performs the inclination correction of 5° which is the correctable maximum angle (Step S109).

The CPU 801 confirms whether the original is present or not on the original tray 30 (Step S110). If the original is present (Step S110: Yes), the CPU 801 performs control again from the start of the original conveyance (returns to the processing of the step S101). If no original is present in the processing of the step S110 (Step S110: No), the CPU 801 determines that all the images of the original are read and finishes the job.

If the user does not closely align the original guide plates 31 with the original width, the width between the original guide plates 31 becomes greater than the original width (width between the original guide plates 31>original width). In this case, it is No in the processing of the step S104 (original guide width+α>detected main scanning width). It is also No in the processing of the step S107 (original guide width+α>detected main scanning width). Thus, the control of performing the inclination correction if the inclination of the original is less than 5° and not performing the inclination correction if the inclination of the original is equal to or more than 5° is realized.

As described, in the image reading apparatus according to the present embodiment, it becomes possible to control to perform the inclination correction for the fixed form original to be corrected, and not to perform the inclination correction for the original having a possibility of deteriorating the image by performing the inclination correction such as the original of which front end is skewed.

In particular, instead of the mode setting performed by the user, it is possible to automatically control to perform the inclination correction by the maximum correction angle if the original is the rectangular original and not to perform the inclination correction if the original is the original for which no inclination correction should be performed. It means that, regarding the inclination correction of the image of the original by the image processing, if the non-rectangular original is corrected, it becomes no longer an appropriate image as compared with that before the correction. It becomes possible to automatically control to switch to perform or not to perform the correction by separating whether the original is the rectangular original or not. It is noted that the original for which no inclination correction should be performed means, for example, that any improvement of the image of the original cannot be expected, even if the inclination correction is performed, because the front end side is skewed by a certain angle or more.

Second embodiment

In the following, a second embodiment will be described. As for the configuration of the image reading apparatus according to the present embodiment, the same parts as those of the image reading apparatus according to the first embodiment are denoted by the same symbols and the description is omitted. In the following, the inclination correction when performing the image reading job of the image reading apparatus 1000 will be described with reference to FIG. 8 and FIG. 9.

Inclination Correction Method at the Time of Image Reading Job

Figure 8:
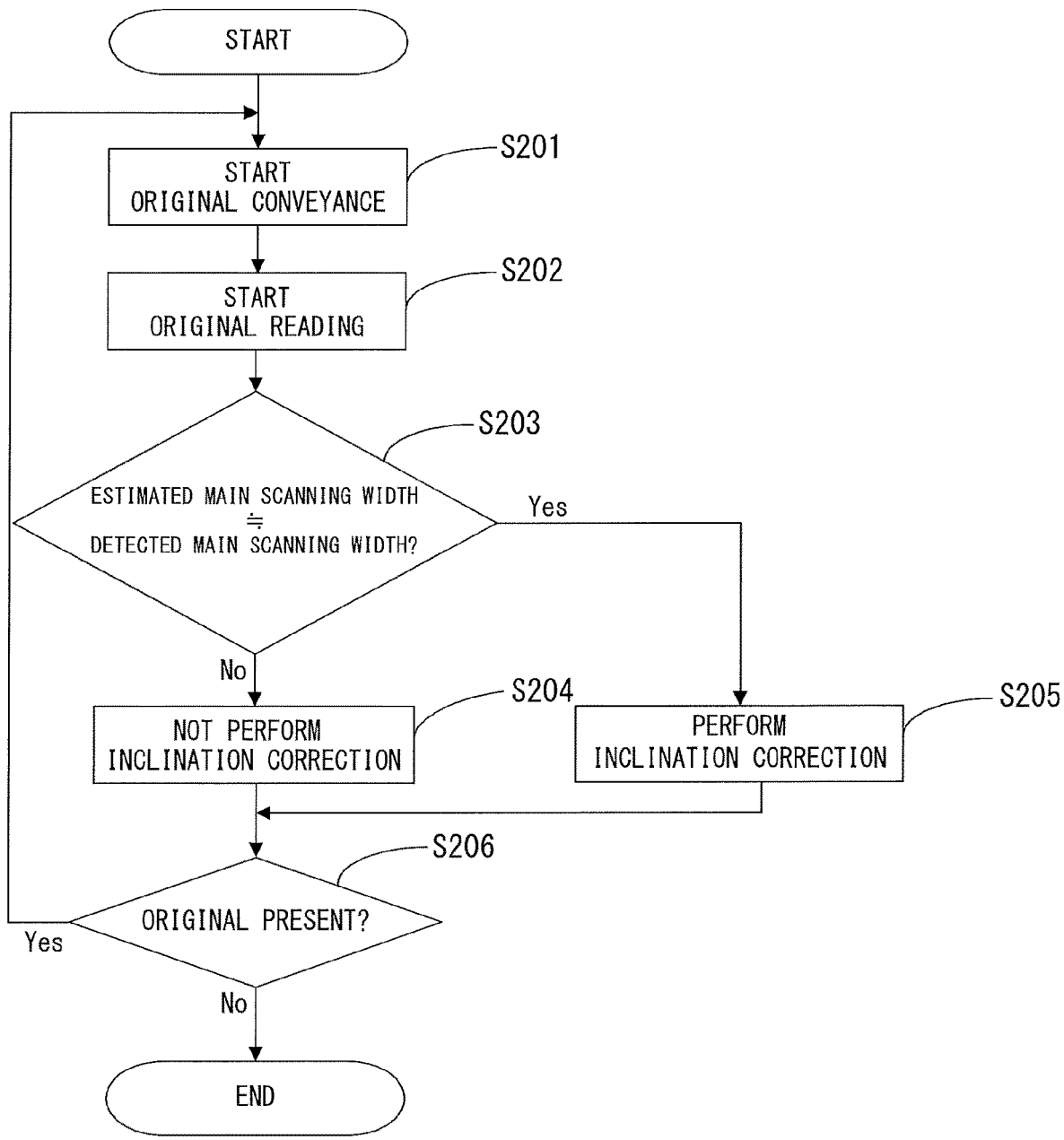
FIG. 8 is a flowchart showing an example of the processing procedure of the image reading processing by the image reading apparatus according to a second embodiment.
Figure 9:
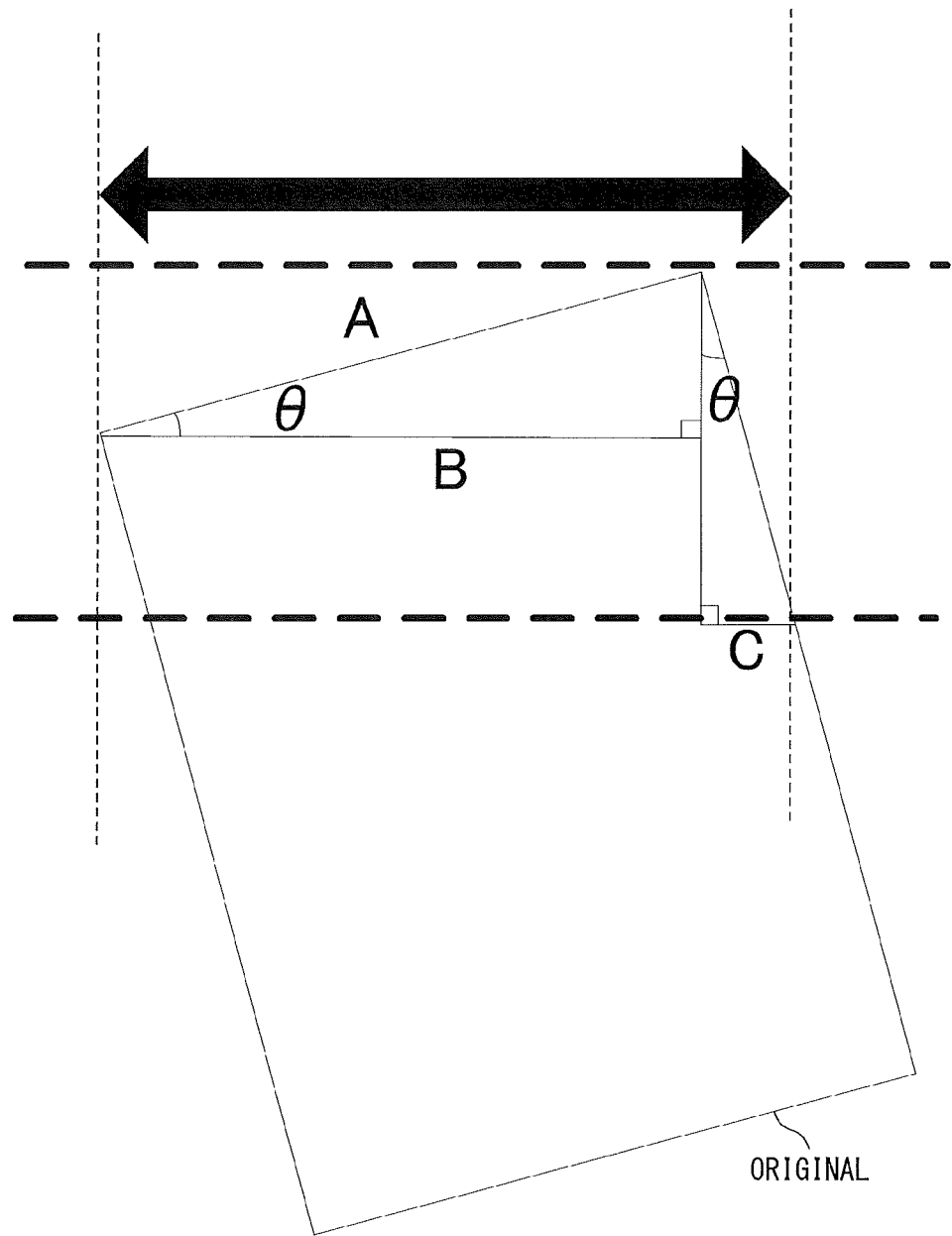
FIG. 9 is a diagram for describing the original which is conveyed inclined and the detected main scanning direction of the original.

FIG. 8 is a flowchart showing the processing procedure of the image reading processing by the image reading apparatus according to the present embodiment. It is noted that the CPU 801 mainly performs each processing shown in FIG. 8. FIG. 9 is a diagram for describing the original which is conveyed inclined and the detected main scanning width of the original.

The description is given assuming that the user of the image reading apparatus 1000 performs the image reading by placing the original on the original tray 30 and operating the operation part 904. In this case, the CPU 901 outputs the image reading execution instruction (job execution instruction) to the CPU 801. When receiving the job execution instruction, the CPU 801 starts the flow reading of the original mentioned in the configuration example of the auto document feeder (ADF) 100.

The CPU 801 starts to convey the original placed on the original tray 30 (Step S201). The CPU 801 starts to read the original conveyed near the original reading position (Step S202). The CPU 801 detects the inclination of the image of the original read in the processing of the step 5202 using the inclination detection function of the image processing part 833 as previously mentioned and determines, based on the result of the detection, whether the original is a normal original or not (Step S203).

If the original has a normal shape, if the user correctly sets the original guide plates 31 along the original, the original guide width=A. On the other hand, the main scanning width to be detected is, according to FIG. 9, B+C. Here, the inclination θ is known by the inclination detection. Thus, if the original is the rectangular original, using the original guide width and the detection inclination θ, the detected main scanning width W at the position of 100 mm from the front end can be estimated by a formula 5 shown below.

$$W = B + C = A\sin(180-90-\theta)° + 100/\tan(180-90-\theta)° \dots \quad \text{(formula 5)}$$

It is assumed that the calculation is performed for each original to obtain the estimated main scanning width and the detected main scanning width which is actually detected is within the estimated main scanning width ±1 mm. In this case, the CPU 801 determines that the estimated main scanning width estimated from the original guide width is almost the same (matches) as the detected main scanning width to be detected (Step S203: Yes) and that the original is the rectangular original. The CPU 801 then performs the inclination correction (Step S205). Further, if not, the CPU 801 determines that the estimated main scanning width estimated from the original guide width is not the same (does not match) as the detected main scanning width to be detected (Step S203: No) and that the original is not the rectangular original. Then, the CPU 801 does not perform inclination correction (Step S204).

The CPU 801 confirms whether the original is present or not on the original tray 30 (Step S206). If the original is present (Step S206: Yes), the CPU 801 performs control again from the start of the original conveyance (returns to the processing of the step S201). If no original present in the processing of the step S206 (Step S206: No), the CPU 801 determines that all the images of the original are read and finishes the job.

As described, in the image reading apparatus according to the present embodiment, it becomes possible to control to perform the inclination correction for the fixed form original to be corrected, and not to perform the inclination correction for the original having a possibility of deteriorating the image by performing the inclination correction such as the original of which front end is skewed.

Third Embodiment

In the following, a third embodiment will be described. It is noted that, as for the configuration of the image reading apparatus according to the present embodiment, the same parts as those of the image reading apparatus according to the first embodiment and the second embodiment are denoted by the same symbols and the description is omitted. In the following, the inclination correction when performing the image reading job of the image reading apparatus 1000 will be described with reference to FIG. 6, FIG. 7, FIG. 10, and FIG. 11.

Inclination Correction Method at the Time of Image Reading Job

Figure 10:
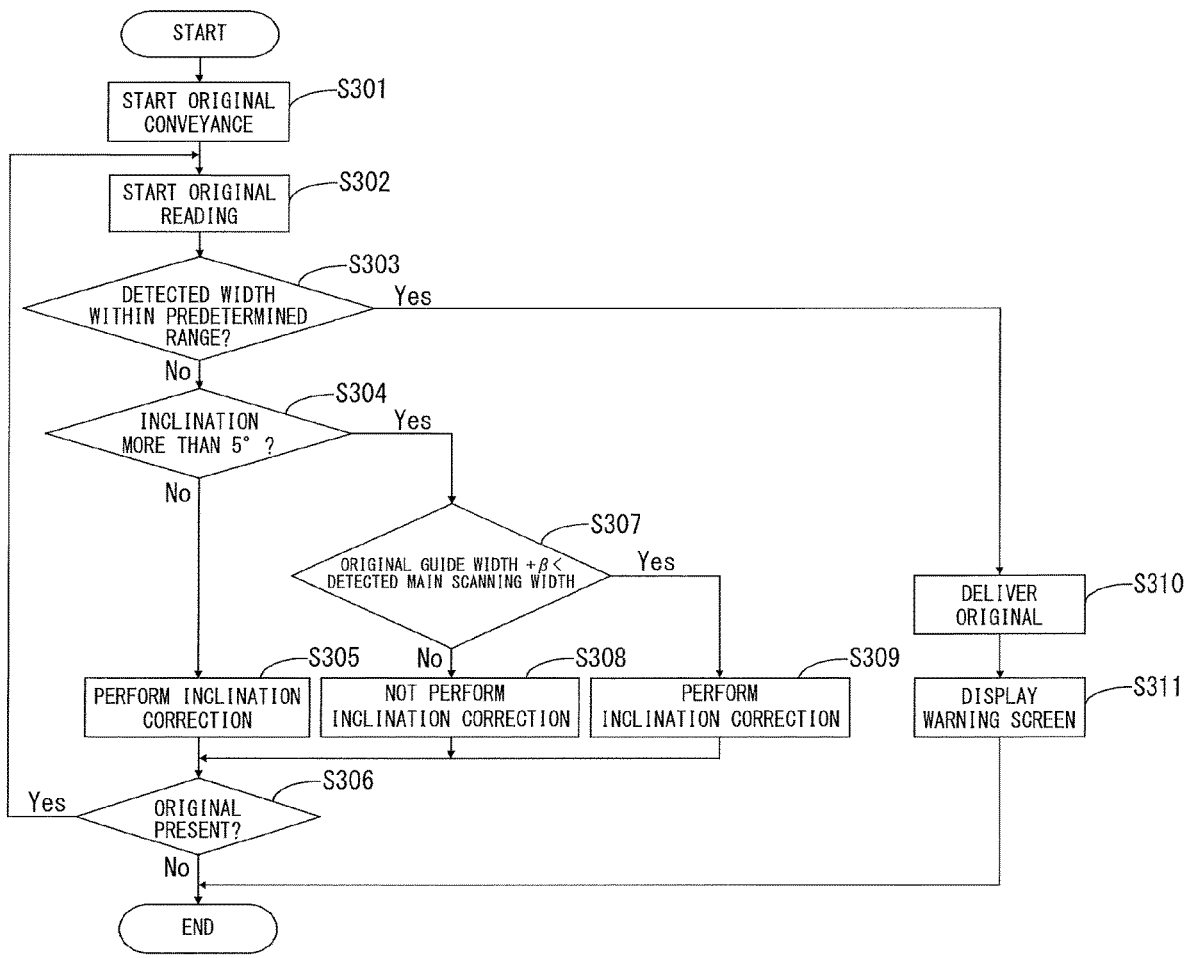
FIG. 10 is a flowchart showing an example of the processing procedure of the image reading processing by the image reading apparatus according to a third embodiment.
Figure 11:
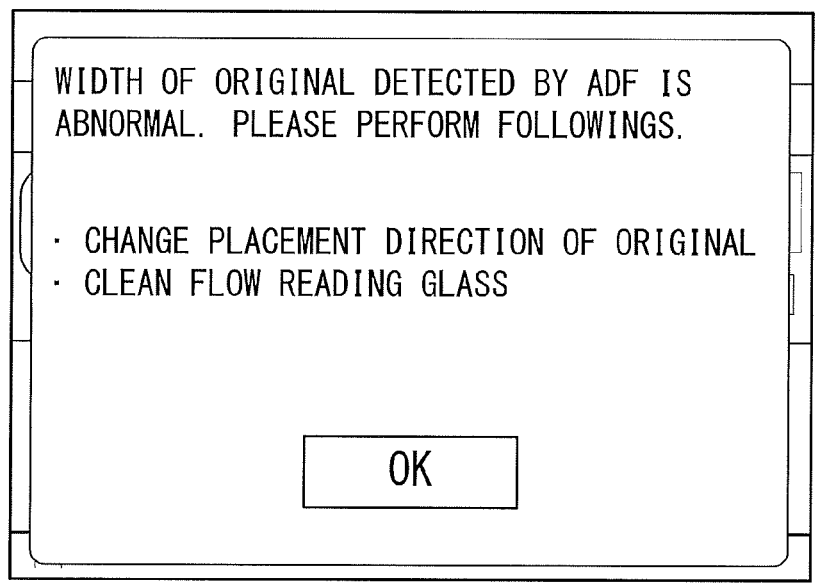
FIG. 11 is a diagram showing an example of a warning screen to a user which is displayed on a display screen of an operation part.

FIG. 10 is a flowchart showing the processing procedure of image reading processing by the image reading apparatus according to the present embodiment. It is noted that the CPU 801 mainly performs each processing shown in FIG. 10. FIG. 11 is a diagram showing an example of a warning screen to the user which is displayed on the display screen of the operation part 904. The description is given assuming that the user of the image reading apparatus 1000 performs the image reading by placing the original on the original tray 30 and operating the operation part 904. In this case, the CPU 901 outputs the image reading execution instruction (job execution instruction) to the CPU 801. When receiving the job execution instruction, the CPU 801 starts the flow reading of the original mentioned in the configuration example of the auto document feeder (ADF) 100.

The CPU 801 starts to convey the original placed on the original tray 30 (Step S301). The CPU 801 starts to read the original conveyed near the original reading position (Step S302). The CPU 801 performs the detection of the main scanning width of the original by the main scanning width detection function of the image processing part 833 as previously mentioned to confirm whether the detected main scanning width detected is within a predetermined range or not (Step S303).

Here, for example, if the main scanning width of the original detected is equal to or more than 300 mm which is the conveyable width or is equal to or less than 100 mm which is the minimum conveyable width, it is clear that it is in an abnormal state. If the detected width is equal to or more than 300 mm or is equal to or less than 100 mm in the processing of the step S303, the CPU 801 determines that the detected main scanning width detected is outside the predetermined range (Step S303: Yes).

If the detected main scanning width detected is outside the predetermined range (Step S303: Yes), the CPU 801 controls to deliver the original to the original delivery tray 13 (Step S310) and outputs an abnormal width detection notification to the CPU 901. The CPU 901 having received the abnormal width detection notification displays a warning screen on the display screen of the operation part 904 such as that shown in FIG. 11 (Step S311).

Here, the warning screen shown in FIG. 11 will be described. When the front end of the original has a tab or is jagged, or when the surface flow reading glass 201 is dirty, there is a possibility that the image processing part 833 fails to successfully detect the edge of the front end of the original so that the detected main scanning width to be detected becomes abnormal. Thus, through the warning screen, the user is urged to change the direction of the original and clean the surface flow reading glass.

It is noted that in the present embodiment, the state is determined only by the detected main scanning width, however, other method can be employed to detect the abnormal state. For example, a case where the inclination angle is inclined to an extent that cannot be expected by a normal conveyance, a case where the shadow of the front end does not become a straight line, a case where the relation of the inclination, the detected main scanning width, and the original guide width is wrong, or the like is considered. In these cases, there is a possibility that the original guide width detection sensor 10 fails to correctly detect the width. Thus, in addition to the warning to the user as mentioned, notification to urge the user to perform the output value adjustment mode of the original guide width detection sensor 10 or replace the sensor may be performed. Further, if the sheet feeding roller 1 exceeds the number of durable sheets and is consumed, there is a possibility that the inclination of the original increases. Thus, the notification to urge the user to replace the sheet feeding roller 1 may be performed.

If the detected width is less than 300 mm and larger than 100 mm in the processing of the step S303, the CPU 801 determines that the detected main scanning width detected is within the predetermined range (Step S303: No). In this case, the CPU 801 detects the inclination of the image of the original read in the processing of the step S302 using the inclination detection function of the image processing part 833 as previously mentioned. Then, the CPU 801 determines whether the inclination is the correctable angle or not (Step S304). It means that the CPU 801 determines whether the angle exceeds an upper limit capable of correcting the inclination.

If the inclination of the image of the original is equal to or more than 5° in the processing of the step S304 (Step S304: Yes), the CPU 801 compares the width between the original guide plates 31 to be detected by the original guide width detection sensor 10 with the main scanning width detected by the detection method of the main scanning width of the original (Step S307). In this comparison, the increase in width from the original guide width with respect to the detected main scanning width in a case where the inclination of the original is the correctable maximum angle of 5° is defined as a. It is assumed that the detected main scanning width is the width detected to the position of 100 mm from the front end position using the main scanning width detection method as previously mentioned. It is also assumed that the original guide width is obtained when the user closely aligns the original guide plates 31 with the original when the user places the original on the original tray 30 and the width between the guide plates 31 is equal to the original width. Also, "α" mentioned here is the same as "α" shown in FIG. 6 which is described in the first embodiment.

Further, in the present embodiment, the original of which front end is inclined is detected without a calculation of trigonometric function. This is achieved by defining and using a constant β for control instead of using the original guide width but. The constant β is a constant through which α<β is always attained. Here, β is defined as a fixed value but other definition may be used. For example, a table in which a value of β is defined for each range of a certain original width may be prepared in advance. A particular value of β in the present embodiment is determined as follows. As shown in FIG. 6, using the main scanning width detection method as previously mentioned, the main scanning width to the position of 100 mm from the front end is: the black arrow width=B+C. The increased width α increased by the inclination of the original of 5° can be expressed as a formula 6 shown below using the original guide width=original width A.

$$\alpha = B+C-A = A\sin(180-90-5)° + 100/\tan(180-90-5)° - A \ldots \quad \text{(formula 6)}$$

In the present embodiment, in the range of the original width 300>A>100 mm where the conveyance of the original is possible, generally, the increased width α is: 7.60<α<8.37 mm. Thus, β is defined as 8.40 mm. Thus, if the user closely aligns the original guide plates 31 with the original, if the inclination of the original is less than 5° at the time of reading the original, a slight variation occurs depending on a size of the original though, generally, the normal rectangular original has the relation of "original guide width+β>detected main scanning width". Similarly, if the inclination of the original is equal to or more than 5° at the time of reading the original, generally, the normal rectangular original has the relation of "original guide width+β<detected main scanning width". Then, control is performed by dividing conditions as below using β as mentioned above.

If "original guide width+β<detected main scanning width" (Step S307: Yes), the CPU 801 determines that the original is the rectangular fixed form original such as (2) shown in FIG. 7 and performs the inclination correction (Step S309).

If "original guide width+β≥detected main scanning width" (Step S307: No), the CPU 801 determines that the original is the original of which front end side is inclined and is not the fixed form original such as (3) shown in FIG. 7. In this case, the CPU 801 does not perform inclination correction (Step S308).

If the inclination of the image is less than 5° in the processing of the step S304 (Step S304: No), or it is the angle which is correctable by the inclination correction function, the CPU 801 butts the original on the registration roller 4 to correct the inclination (Step S305). In particular, the inclination correction is performed using the front end as a reference.

The CPU 801 confirms whether the original is present or not on the original tray 30 (Step S306). If the original is present (Step S306: Yes), the CPU 801 controls again from the start of the original conveyance (returns to the processing of the step S301). If no original is present in the processing of the step S306 (Step S306: No), the CPU 801 determines that all the images of the original are read and finishes the job.

As mentioned, in the image reading apparatus according to the present embodiment, if the inclination detected by the inclination detection is less than 5°, it is possible to control to perform the inclination correction to always make the front end parallel similar to the correction of butting the original on the registration roller 4., It is also possible to control not to perform the inclination correction for the original having a possibility of severely deteriorating the image by performing the inclination correction such as the original of which inclination detected by the inclination detection is equal to or more than 5° and front end is skewed. It is also possible to control to perform the inclination correction by the possible amount for the original of which inclination detected by the inclination detection is equal to or more than 5° and which is estimated to be the rectangular fixed form original.

The embodiments as previously described are those to particularly describe the present disclosure so that the scope of the disclosure is not limited to these examples. It is noted that a main purpose of the present disclosure is to provide an image reading apparatus capable of determining whether or not to perform the inclination correction for the original to be read and the image reading apparatus of the embodiments as previously mentioned can achieve the purpose.

While the present invention has been described with reference to exemplary embodiments and it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No.2018-016105, filed Feb. 1, 2018 which is hereby incorporated by reference herein in its entirety.

What is claimed is:

1. An image reading apparatus, comprising:
   a tray on which an original is to be placed;
   a conveyor configured to convey the original placed on the tray;
   a detector configured to detect a first width corresponding to a size of the original in a width direction perpendicular to a conveying direction of the original;
   an image reader configured to read an image of the original being conveyed by the conveyor to output image data;
   a processor configured to:
      detect, based on the image data, a second width corresponding to a size of the original in the width direction;
      determine an inclination correction condition for the image data;
      perform, based on the inclination correction condition, a skew correction for the image data, and
   a controller configured to determine, based on a comparison result of the first width and the second width, whether or not to perform the skew correction for the image data, wherein the skew correction for the image data is performed based on the inclination correction condition;
   wherein, in a case where an amount of inclination of the original is more than a predetermined value and the second width is less than a value corresponding to the first width, the skew correction is not performed.

2. The image reading apparatus according to claim 1, wherein the controller is configured not to perform the skew correction when an amount of inclination of the original is larger than a first predetermined value.

3. The image reading apparatus according to claim 2, further comprising:
   an original guide configured to regulate the original on the tray for registration in the width direction,
   wherein the detector is configured to detect a position of the original guide.

4. The image reading apparatus according to claim 3, wherein the original guide includes:
   a first guide configured to guide one edge of the original in the width direction; and
   a second guide configured to guide the other edge of the original in the width direction, and
wherein the detector is configured to detect a width between the first guide and the second guide.

5. The image reading apparatus according to claim 4, wherein the controller is configured not to perform the skew correction in a case where an amount of inclination of the original is less than the first predetermined value and a third width is equal to or larger than a fourth width,
the third width corresponding to a width represented by the width information, and
the fourth width corresponding to a width between the first guide and the second guide.

6. The image reading apparatus according to claim 1, further comprising an image forming unit configured to form an image on a sheet based on the image data for which the skew correction is performed.

7. An image reading apparatus, comprising:
   a pair of guide plates arranged in perpendicular with a conveying direction of an original placed on an original tray to sandwich an end of the original in a width direction;
   a guide width measuring unit configured to measure a width between the guide plates with the original sandwiched as a guide width;
   a tray on which an original is to be placed;
   a conveyer configured to convey the original;
   a reading unit configured to read the original being conveyed by the conveyer;
   a first sensor configured to detect a width of the original being conveyed by the conveyer as an original width;
   a second sensor configured to detect an amount of inclination of the original being conveyed by the conveyer;
   an inclination correcting unit configured to correct an image of the original read by the reading unit in accordance with the amount of inclination detected by the second sensor; and
   a controller configured to determine an inclination correction condition for the image of the original, and to compare the guide width detected by the guide width measuring unit with the original width detected by the first sensor and control whether or not to perform an inclination correction by the inclination correcting unit in accordance with a result of the comparison and based on an inclination correction condition for the image of the original,
wherein, in a case where an amount of inclination of the original is more than a predetermined value and width of the original detected by the first sensor is less than a value corresponding to the width between the guide plates detected by the guide width measuring unit, the inclination correction by the inclination correcting unit is not performed.

8. The image reading apparatus according to claim 7, wherein the controller is further configured to control whether or not to perform the inclination correction by the inclination correcting unit in accordance with whether or not the amount of inclination detected by the second sensor exceeds a previously set amount of inclination which is correctable by the inclination correcting unit.

9. The image reading apparatus according to claim 7, wherein the controller is further configured to:
   calculate an original width which is estimated to be detected by the first sensor in a case where the original is conveyed inclined by the amount of inclination which is correctable by the inclination correcting unit;
   compare a result of the calculation with a result of the detection by the first sensor, and
   control whether or not to perform the inclination correction by the inclination correcting unit in accordance with a result of the comparison.

10. The image reading apparatus according to claim 7, wherein the controller is further configured to perform the inclination correction by the inclination correcting unit in a case where the amount of inclination of the original detected by the second sensor does not exceed the amount of inclination which is correctable by the inclination correcting unit.

11. The image reading apparatus according to claim 7, wherein the controller is further configured to estimate a width of the original based on the guide width detected by the guide width measuring unit and the amount of inclination detected by the second sensor and perform the inclination correction by the inclination correcting unit in a case where an estimated result matches the original width detected by the first sensor.

12. The image reading apparatus according to claim 7, further comprising:
   a notifying unit configured to notify information to a user of the image reading apparatus;
   wherein the controller is further configured to notify the user of predetermined information through the notifying unit in a case where the first sensor fails to normally detect the original width.

13. The image reading apparatus according to claim 12, further comprising:
   a notifying unit configured to notify a user of the image reading apparatus of information;
   wherein the controller is further configured to notify the user of predetermined information through the notifying unit in a case where the guide width measuring unit fails to normally detect the guide width.

14. The image reading apparatus according to claim 12, wherein the predetermined information notified by the notifying unit is information to urge the user to clean the apparatus.

15. The image reading apparatus according to claim 12, wherein the predetermined information notified by the notifying unit is information to urge the user to replace the conveyer.

16. The image reading apparatus according to claim 12, further comprising:
   an adjusting unit configured to adjust the result of the detection of the first sensor;
   wherein the predetermined information notified by the notifying unit is information to urge adjustment by the adjusting unit.

17. The image reading apparatus according to claim 12, wherein the predetermined information notified by the notifying unit is information to urge the user to change a placement direction of the original.

18. The image reading apparatus according to claim 7, further comprising:
   a notifying unit configured to notify a user of the image reading apparatus of information;
   wherein the controller is further configured to notify the user of predetermined information through the notifying unit in a case where the second sensor fails to normally detect the amount of inclination of the original.

19. The image reading apparatus according to claim 7, wherein the first sensor is configured to derive a width of the original by detecting a shadow of the end of the original in the image of the original read by the reading unit.

* * * * *